United States Patent [19]

Lock

[11] 4,440,589

[45] Apr. 3, 1984

[54] PRINT TRANSFER DEVICE FOR DECORATING MACHINE

[75] Inventor: William E. Lock, Horseheads, N.Y.

[73] Assignee: Corning Glass Works, Corning, N.Y.

[21] Appl. No.: 332,722

[22] Filed: Dec. 21, 1981

[51] Int. Cl.³ .................... B32B 31/00; B29C 17/04; B65C 9/04; B41D 7/00

[52] U.S. Cl. .................................. 156/232; 156/212; 156/229; 156/235; 156/277; 156/449; 156/240; 156/582; 156/DIG. 11; 101/38 R; 101/34

[58] Field of Search .............. 156/240, 230, 232, 229, 156/235, 249, 277, 289, 344, 384, 358, 360, 361, 363, 387, 449, 458, 542, 541, 582, DIG. 11, DIG. 12, DIG. 13, DIG. 99, 212, 539, 215, DIG. 6, DIG. 9, DIG. 10; 101/38, 39 R, 39 A, 40; 428/914

[56] References Cited

U.S. PATENT DOCUMENTS

| | | | |
|---|---|---|---|
| 2,674,929 | 4/1954 | Wittkuhns et al. | 101/38 A |
| 3,302,580 | 2/1967 | Edwards et al. | 101/39 |
| 3,443,515 | 5/1969 | Smith et al. | 101/38 R |
| 3,598,043 | 8/1971 | Schuff | 101/40 |
| 4,214,937 | 7/1980 | Geurtsen et al. | 156/361 |
| 4,216,044 | 8/1980 | Herdzina et al. | 156/449 |
| 4,261,749 | 4/1981 | Johnson . | |
| 4,280,939 | 7/1981 | Johnson . | |
| 4,292,104 | 9/1981 | Heinbach et al. . | |
| 4,300,974 | 11/1981 | Bauer | 156/360 |
| 4,336,095 | 6/1982 | Hoffman | 156/235 |

*Primary Examiner*—Edward C. Kimlin
*Assistant Examiner*—Louis Falasco
*Attorney, Agent, or Firm*—B. R. Turner

[57] ABSTRACT

In one embodiment, the apparatus of the present invention includes a rotatably driven transfer means adapted to receive a design configuration and follower means synchronously driven therewith for carrying and orienting an article to receive the design from the transfer means into alignment therewith in nonslip rolling contact. The respective transfer means and article share a respective center and apex as established by the follower means. In another embodiment the transfer means and article are forced into engagement via an elastic interface.

11 Claims, 17 Drawing Figures

PRINT TRANSFER DEVICE FOR DECORATING MACHINE

BACKGROUND OF THE INVENTION

The present invention relates to a printing apparatus and a method of carrying out various printing functions. Although many applications for the invention may be possible, the disclosure herein emphasizes the application to ware decoration. It should be understood that articles of many types may be printed or decorated using the apparatus and method of the present invention and such applications are part of the invention herein.

In multicolor ware decoration, speed, versatility, ease of setup, quality of reproduction, accuracy of registration, and cost effectiveness are important factors to consider. State of the art decorating devices approach some but not all of the above factors satisfactorily. The present invention was developed for various reasons including a desire to both take advantage of the latest ink and elastomer technology and to maximize printing rates without sacrifice of registration.

The apparatus of the present invention makes use of geometric relationships of conic sections. First, a cone when placed on the flat surface and rolled, will trace an arc centered at the same point as the apex of the cone. The cone will travel along this path freely with no slipping between the surfaces. Second, two cones sharing the same apex and placed side by side will roll one on the other without slipping along the line of contact. As will be shown below, by choosing the proper ratio of circumferences between the first mentioned cone and the arc traced in the plane of the flat surface, the cone will roll an integral number of revolutions as it travels one revolution about the traced arc. Similarly the proper choice of circumference ratios of cones will produce integral rotations with each other and the arc. Therefore, discrete locations of the cone will always match up with discrete locations along the arc in the flat surface. Accordingly, a special case of synchronous motion may be defined.

The two cones and the flat surface may be driven in synchronism by a proper gearing arrangement, from which a device may be produced which will establish pattern registration from one set of cones to another and the surface as hereinafter illustrated.

The device of the present invention may be operated in various ways to establish a degree of versatility not heretofore available in the prior art and is especially adapted for printing designs on exterior surfaces of drinking cups and the like.

In a series of related U.S. patent applications Ser. Nos. 332,723; 332,724; 332,725, 332,726, filed this same date and assigned to the now U.S. Pat. No. 4,379,818; assignee herein various arrangements of related apparatus for use with the present invention are disclosed in detail. It should be understood that, to the extent necessary, the teachings of said applications should be considered incorporated by reference herein.

SUMMARY OF THE INVENTION

In one embodiment, the apparatus of the present invention includes a rotatably driven transfer means adapted to carry a design configuration and follower means synchronously driven therewith for carrying and orienting an article to receive the design from the transfer means into alignment therewith in nonslip rolling contact. The respective transfer means and article share a respective center and apex as established by the follower means. In another embodiment the transfer means and article are forced into engagement via an elastic interface.

DESCRIPTION OF THE DRAWINGS

FIG. 12 is a schematic view of an alternate embodiment of the present invention for a decal printer and the like.

DESCRIPTION OF THE PREFERRED EMBODIMENT

Figure 1:
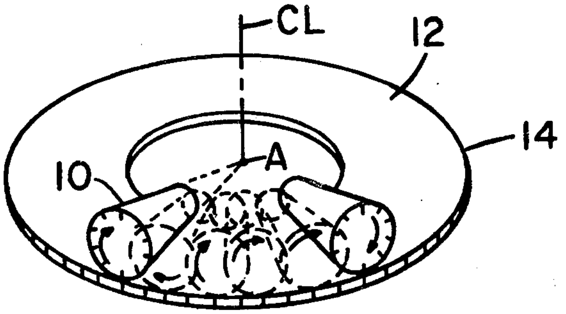
FIGS. 1–4 show the geometric relations between the various components and generally illustrate an operating principle of the apparatus of the present invention.

The apparatus of the present invention makes use of geometric relationships special to conic sections. First, referring to FIG. 1, a cone 10 (truncated as shown), having an apex point A, when placed on a flat surface 12 and rolled, will trace a circular arc or disk 14 about a center line CL and having as its apex A located thereon. The cone 10 will travel along this path freely with no slipping. Second, referring to FIG. 2, two cones, the first mentioned 10 above and another 16 having the same apex A and placed side by side, roll one on the other with no slipping along the line of contact or ray 18.

Figure 2:
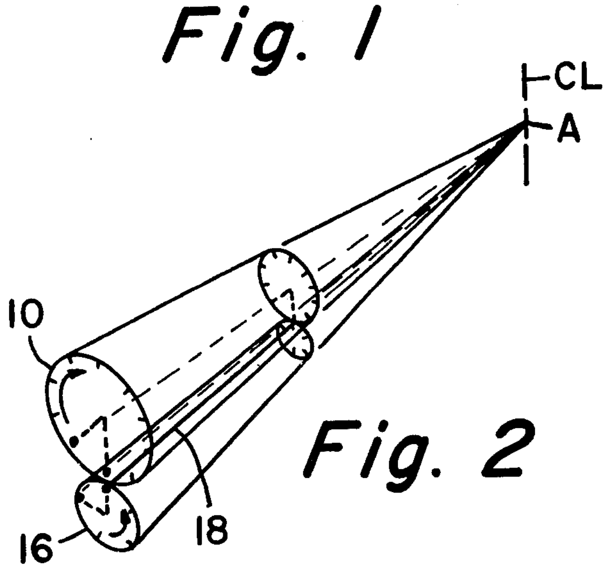
Figure 3:
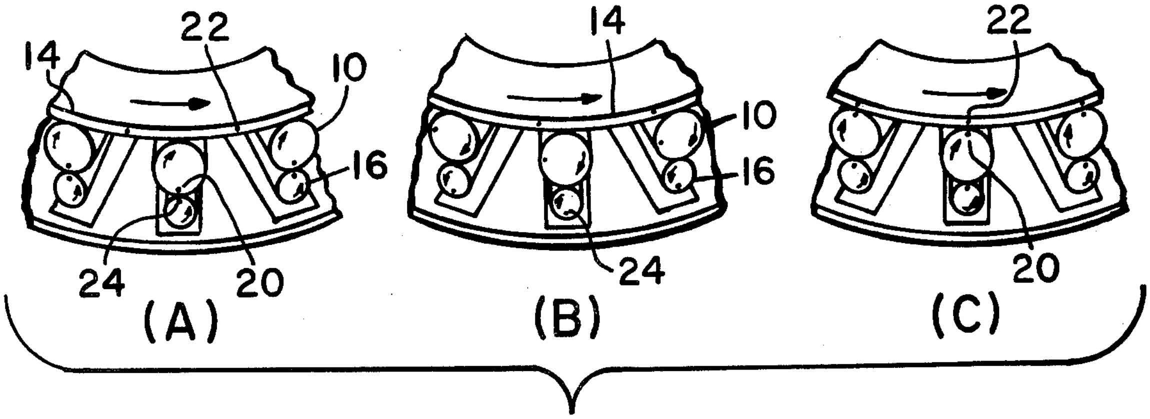

FIG. 3 at (A)–(C) illustrates that by combining the principles of FIGS. 1 and 2 and by choosing the proper ratio of circumferences between the arc 14 and cone 10, the latter will roll an integral number of revolutions as it travels one revolution around arc 14. This means that discrete locations 20 on the cone 10 will always match up with the discrete locations 22 on the arc 14. Likewise by choosing the proper ratios of circumferences between the two cones 10 and 16, one will rotate an integral number of times for each revolution of the other. Thus, discrete locations 24 on the cone 16 will always match those discrete locations 20 on cone 10 as the cones are continuously rotated.

Figure 4:
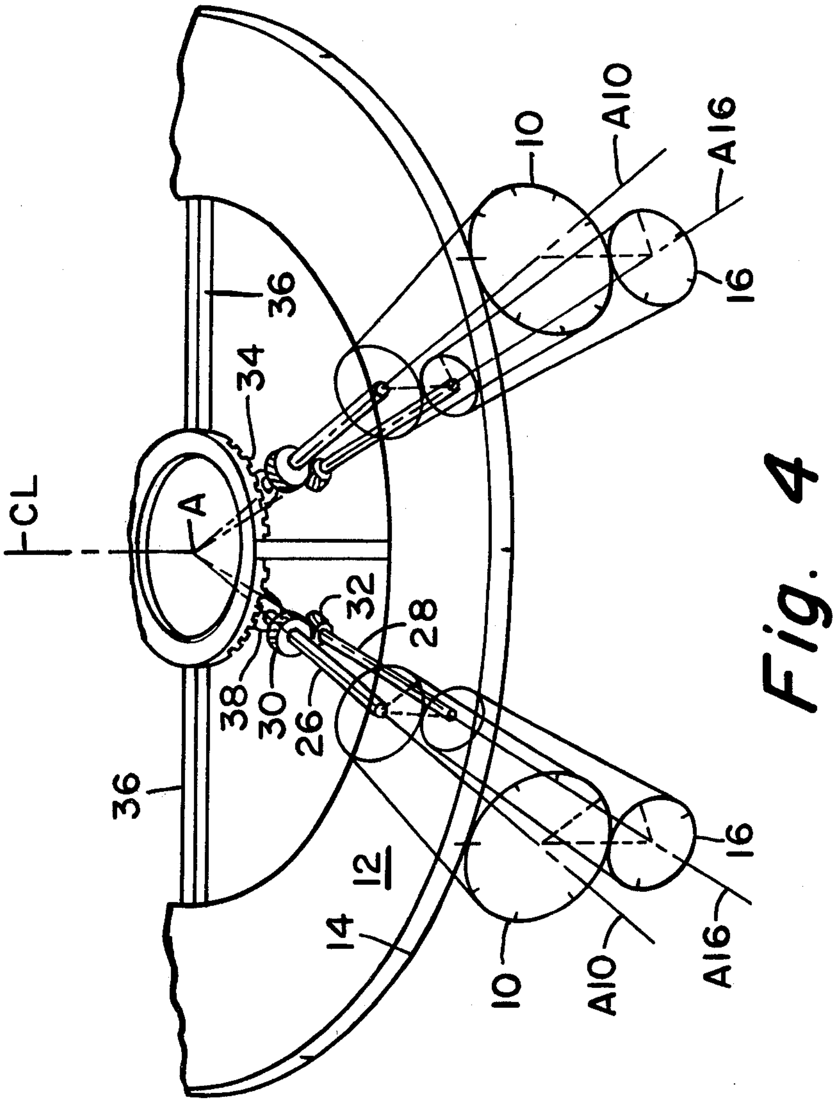

FIG. 4 shows that the cones 10 and 16 can be geared one to the other and positively driven at the no slip ratio via respective mounting shafts 26 and 28 carrying spiral bevel gears 30 and 32. The same is true of the flat surface 12 and cone 10. FIG. 4 shows rotating flat surface 12 with an associated ring gear 34 carried by webs 36. The ring gear 34 drives multiple sets of the exemplary mating cones 10 and 12 via spiral bevel pinion gears 38 mating with ring gear 34. The cones 10 and 16 are themselves geared to one another as described above. Gears 30, 32, 34 and 38, flat surface 12 and cones 10 and 16 all share the same apex A as a point of rotation. Cones 10 and 16 are fixed in space, so that they rotate about their respective axes A-10, and A-16. Thus, rotation of flat surface 12 and the above mentioned gearing imparts rotational motion to cones 10 and 16 only about respective axes A-10 and A-16. Notice that multiple sets of cones can be placed around the circumference of the flat surface 12 and be driven by the same ring gear 34.

FIGS. 3 and 4 demonstrate that several sets of the cones 10 and 16 when placed around the periphery of the flat surface 12 can be timed one with another to cause synchronization of the respective discrete locations 20, 24 and 22, hereinafter referred to as timing marks.

Figure 5:
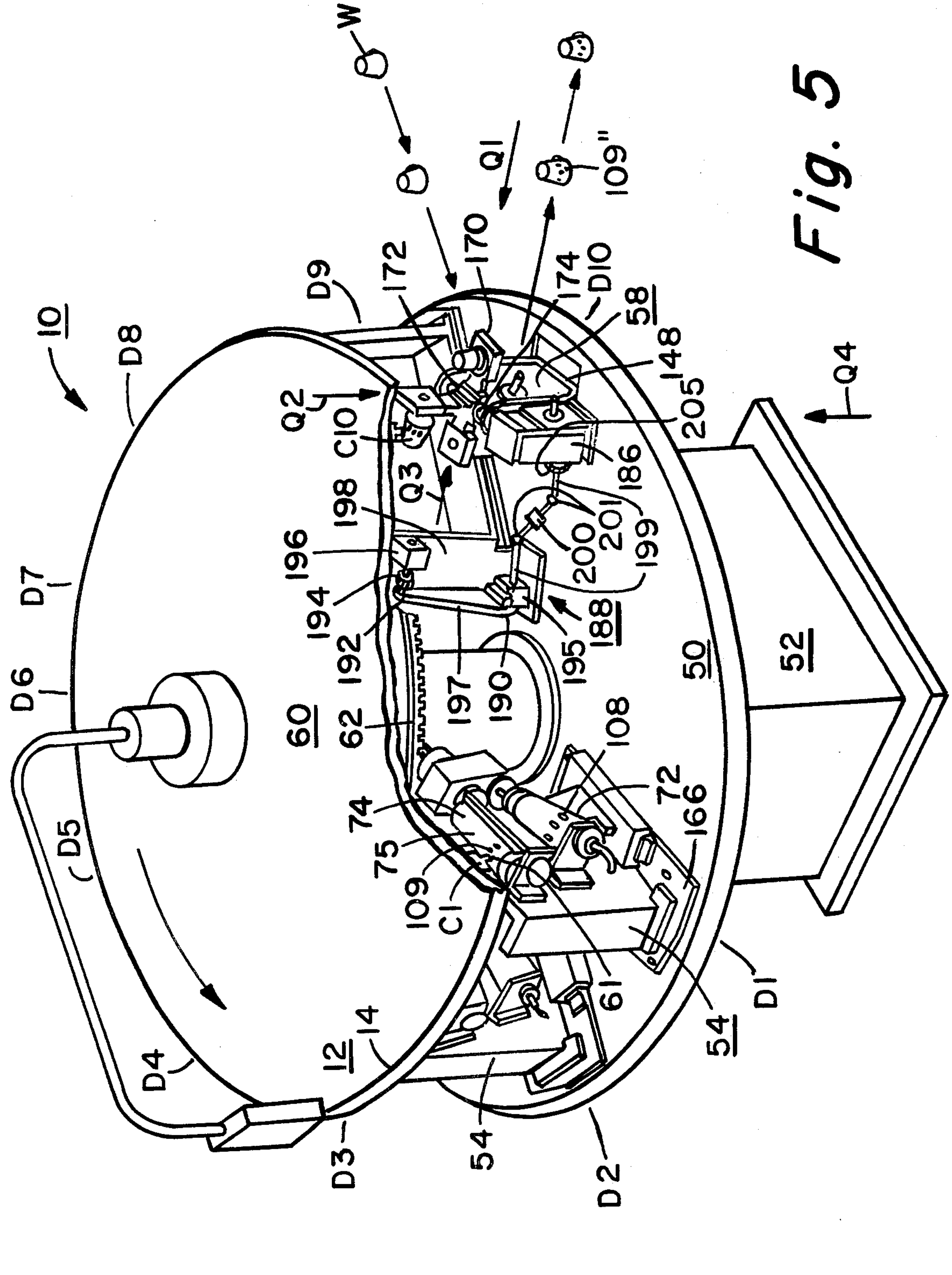
FIG. 5 is a detailed view of an apparatus showing print and print transfer stations of a device incorporating the present invention.

Although useful in other contexts, one embodiment of the present invention comprises a print transfer device 58 illustrated in FIG. 5 in an environment of a printing machine 10. While details of the machine 10 are disclosed in Ser. No. 332,726 referred to above for the sake of clarity a brief description follows. A table 50 mounted on machine base 52 is divided into ten (10) equally spaced divisions or stations D1–D10. Eight (8) printing station assemblies 54 are rigidly mounted, one each, at eight of the stations D1–D8 around the periphery of the table 50. One cleaning roll assembly not shown herein is also mounted to the table 50 at station D9. One embodiment of a cam driven, arc following, print transfer assembly 58 that indexes ware W into position for decorating is located at station D10. Another simplified embodiment adapted to be operable with the device machine 10 in FIG. 5 will be discussed hereinafter.

A rotatably mounted turret table 60, adapted to rotate and carry ten (10) collectors C1–C10 (two shown), is driven by a continuous motion cam drive such as a Model 362, manufactured by Ferguson Machine Co. (not shown) housed in the base 52. A ring gear 62 is carried by the turret 60 and functions as described above in reference to FIG. 4. Single printing station assemblies 54 are discussed in Ser. Nos. 332,723 and 332,724 referred to above and will not be detailed herein.

The following is a brief description of the operation of the apparatus of the present invention in the context of printing machine 10. Hereinafter suffix reference numerals are dropped where position is not relevant. As turret 60 rotates it synchronously drives etch cones 72 and transfer cones 74. Each etch cone 72 receives a supply of ink. Design impressions 108, etched or engraved in the surface of etch cone 72, receive the ink and after application/doctoring an ink formed design 109 is available for offset to silicone surface 75 carried by transfer cone 74. It should be understood that silicone surface 75 is a portion of a conical surface having an apex A coincident with the apex of transfer cone 72. That part of the etch cone 72 carrying the ink filled impressions 108 and silicone surface 75, roll in intimate contact against each other. The ink 92 in the impressions 108 is transferred as a semi solid cohesive mass from the former to the latter. Collectors C1–C10 in the form of flat surface segments are mounted to and carried by turret 60. Collectors C each have an elastomeric silicone working surface 61 lying in flat annular surface 12 defined by disk 14. They each encounter successive printing stations 54 from locations D8 to D1 (counterclockwise in FIG. 5) as the turret 60 rotates, the working surfaces 61 of collectors C receive thereon a portion 109 of a composite design 109′ from each successive printing station in registration with the others. At print transfer station D10 the composite design 109′ may be transferred to ware W. The ink forming design portions 109 is transferable because each successive surface encountering the ink has a higher affinity for it than the previous one. See for example U.S. Pat. Nos. 4,280,939. 4,261,749 and 4,292,104, assigned to the assignee herein, for details of such surfaces.

Figure 6:
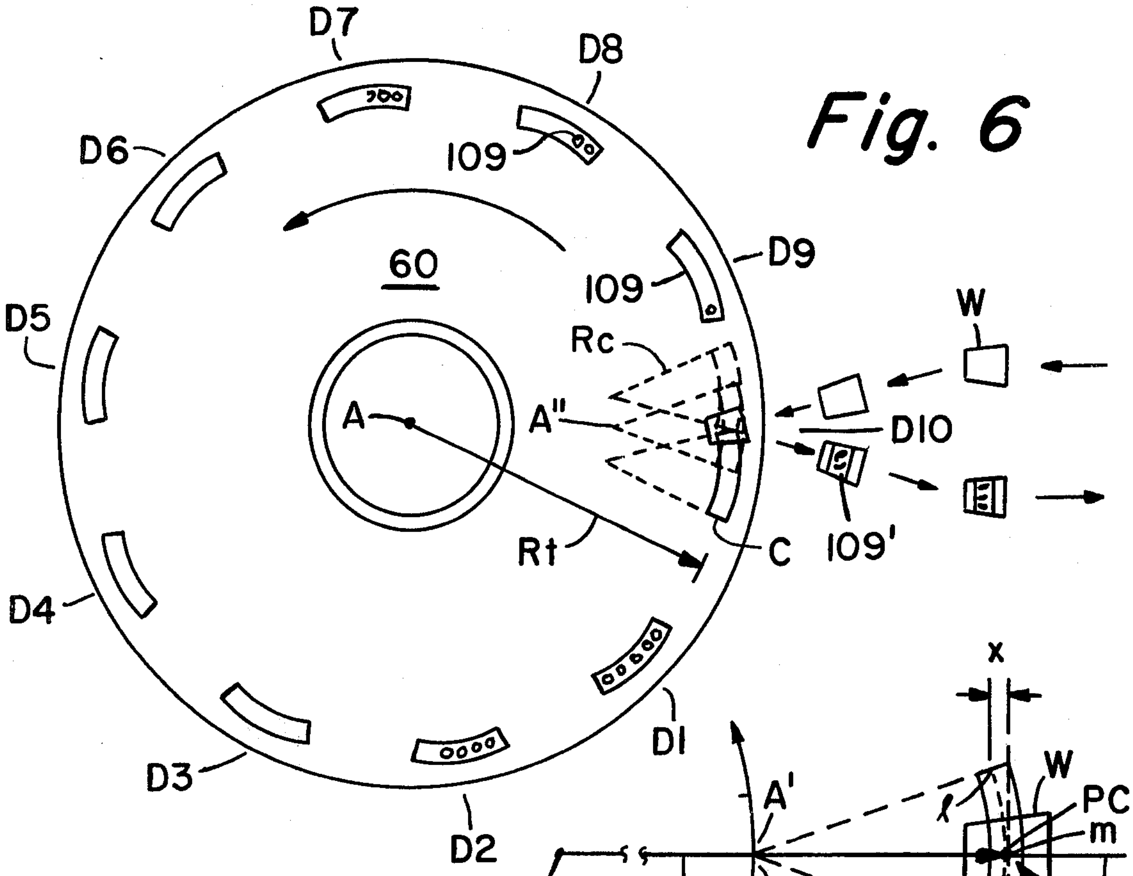
FIGS. 6–7 and 8A–8C schematically illustrate geometric relations for application to a cam following print transfer feature of the present invention.

In one embodiment of the present invention shown in FIG. 6, the rotating turret 60 holds ten (10) collectors C1–C10 in the form of equally spaced flat surface silicone arc sections onto which design portions 109 of the multicolored decoration or composite design 109′ are printed from each silicone surface 75 of the respective printing stations 54 at D1–D8. The radius of curvature Rc of each collector C (sometimes hereinafter the word "radius" and "curvature" are sometimes used interchangably for simplicity) is normally determined in one embodiment by the geometry of the ware W to be decorated (i.e. a portion of its developed surface hereinafter described). Normally the curvature Rc of the collectors will not coincide with the radius of curvature Rt of the turret 60. However, if apex A′ of the ware W can be oriented to instantaneously coincide with the center Cc of the collector C, then a nonslip rolling action between a cone and a surface can be established.

Figure 7A:
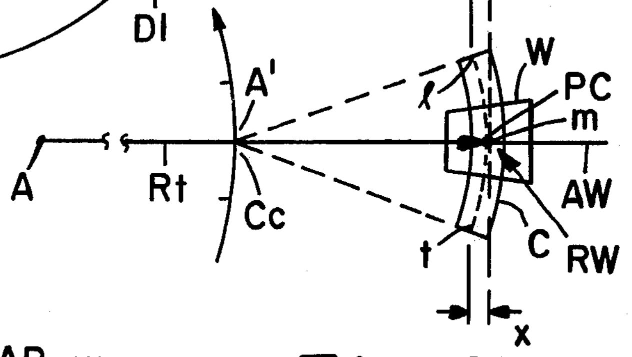
Figure 7B:
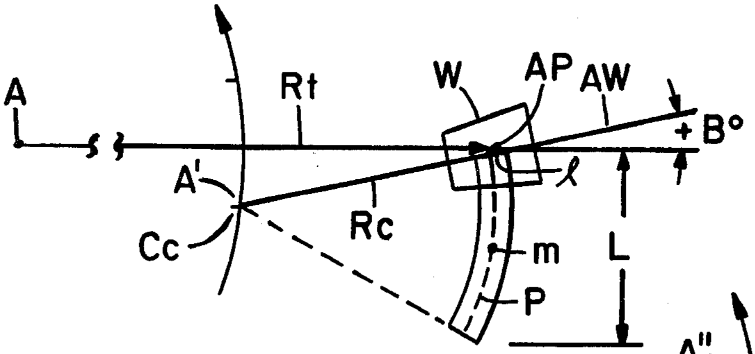
Figure 7C:
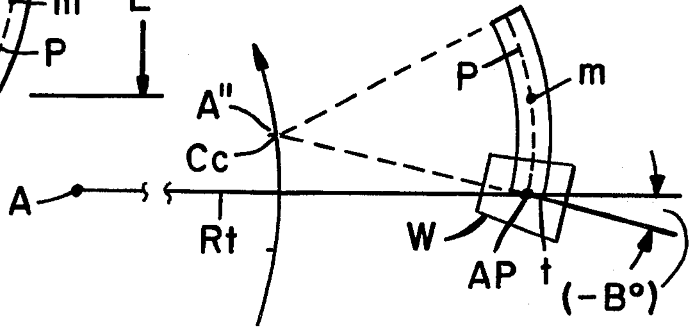

FIG. 6 shows the collectors C1–C10, sometimes hereafter referred to as arc sections C, equally spaced around the turret 60. FIGS. 7A–7C show how ware W must be positioned as the turret 60 revolves and these arc sections C pass over the ware W at print transfer station D10. Such positioning includes both rotational and translational manipulation.

The ware W to be decorated is oriented so that it rolls against the arc sections C without slipping. According to the theory of operation, the ware W must be positioned or oriented so that its apex A′ is shared by the center Cc of the arc sections C at all times of contact, so that a nonstretching nonskidding rolling contact can result.

Figure 8A:
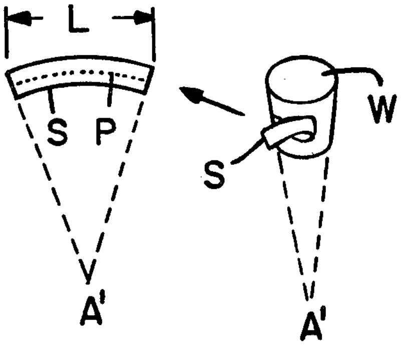

It should be noted that this requirement for changing ware position results because the radius of curvature Rc of the arc sections C is different for each style of ware and different from the radius of curvature Rt of turret 60. The latter is specified by the radial location of the collector C on the machine turret 60. The radius of curvature Rc of the arc sections centered at Cc is dictated by the developed surface S of the conical ware W to be decorated (see FIG. 8A). The length L of the arc section C is dictated by the circumference of the ware W to be decorated along the line or path of application P, substantially centrally of arc section C.

In FIG. 7B the ware W is angularly oriented so that its apex A′ is shifted to follow the center Cc of the arc section C by the angular difference B° between the radius Rc of the arc section C and the radius Rt of turret 60. The axis AW of the ware is oriented so that ware apex A′ is coincident with the center Cc of collector C. In the example herein shown, the collector C is mounted so that its midpoint m coincides with turret radius Rt (see FIG. 7A), but since the curvature Rc of the collector C does not coincide with the curvature Rt of the turret 60, the respective leading and trailing edges l and t of the collector C are inboard (to the left in FIG. 7A) of midpoint m, by x units from the full extent of turret radius Rt. Further since the collector radius Rc has a center or origin Cc different from the center C of turret 60, the ware W must be rotated about its point of contact PC with collector C. The difference in this angular position is illustrated in FIGS. 7B and C where Rc respectively leads and lags Rt by B°. Thus, ware W must be rotated at its point of contact PC about contact axis Ap by 2B°.

Figure 10A:
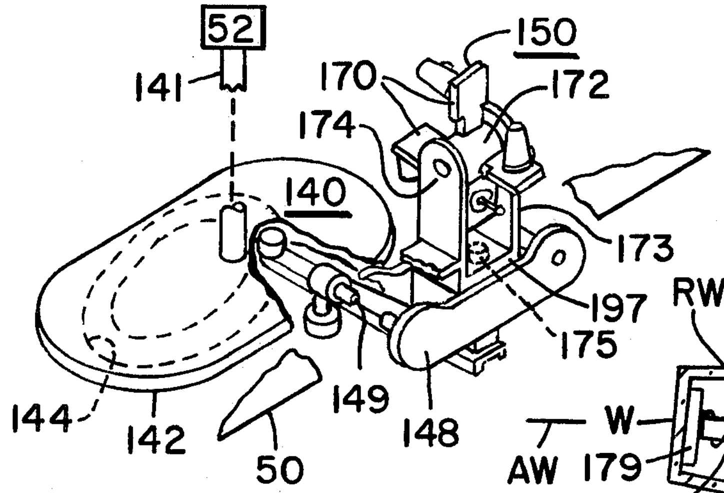
Figure 10B:
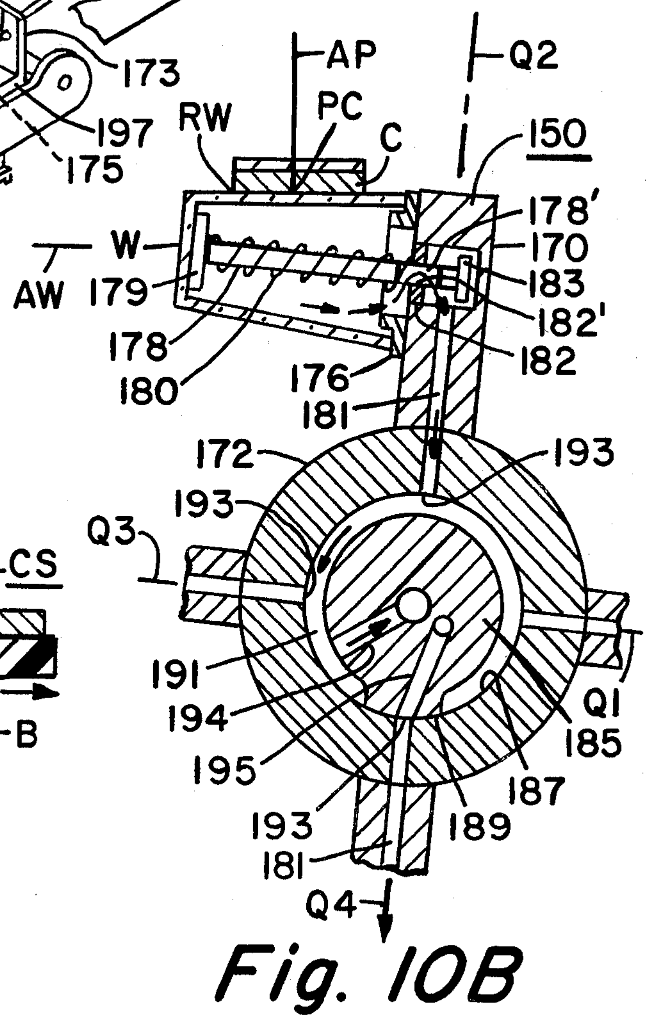

In FIG. 10B ware W is shown in contact with collector C along a line of contact or ray RW shared therebetween. Contact axis AP is normal to ray RW at contact point PC. It is given that ray RW measured from contact point PC be in radial alignment with turret radius Rt at midpoint m of collector C. Any angular or lateral shift therefrom is measured relative thereto. It is therefore required that: (a) the ware W be moved to an initial position upon engagement with leading edge 1 or collector c whereby its contact point PC is shifted x units inboard of its position at midpoint m, and (b) the ware ray RW is rotated B° about contact axis AP counterclockwise (CCW) of turret radius Rt. (For purposes of this discussion, ware axis AW and ware ray RW lie in the same plane and rotation of the ware about contact point PC occurs about pivot or contact axis AP also in such plane).

As the collector C advances counterclockwise (CCW) after first meeting the ware W, the ware is translated and rotated from its initial position noted above (relative to FIG. 7B) into a midway position shown in FIG. 7A. In the midway position, the contact point PC is at midpoint m, lateral translation is zero units and ware axis AW is at zero degrees rotation about contact axis AP. Finally, as the collector C advances further, the ware W is translated to trailing edge t of collector C and rotated so that contact point is positioned x units inboard (to the left in FIG. 7C) and the ware axis AW is rotated B° clockwise (CW). Thus, the ware experiences compound motion from each encounter with a collector C.

Figure 9:
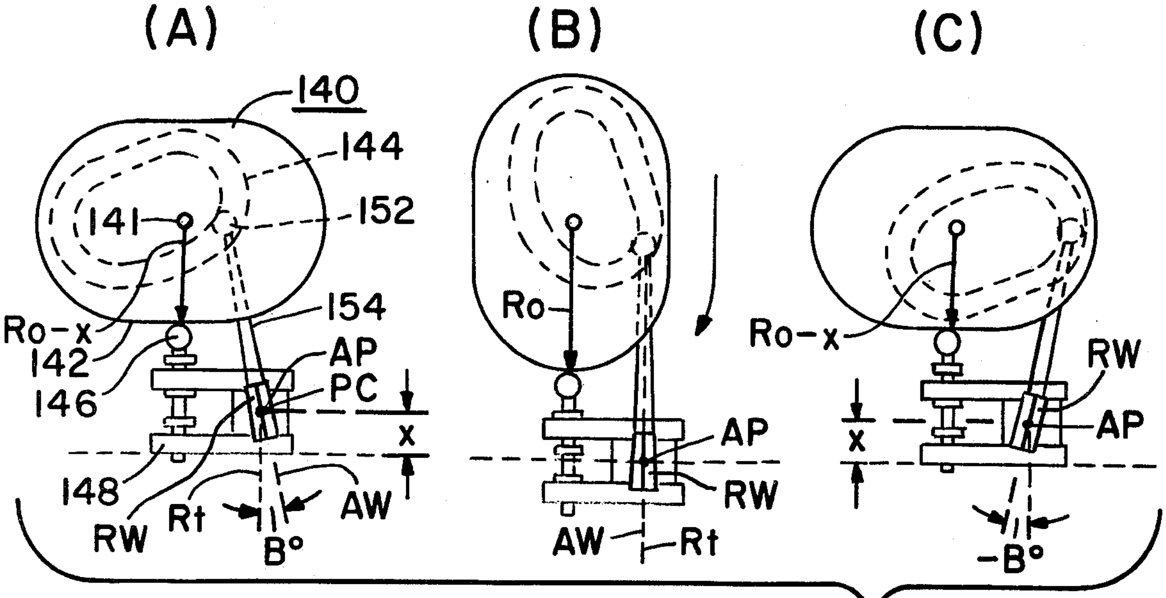
FIGS. 9, 10A and 10B illustrate details of the print transfer apparatus in respective multi-position plan, perspective and side section views.

FIG. 9 at positions (A) through (C) and FIGS. 10A and 10B demonstrate how a cam 140 is used to continuously position the ware W to align its apex A' with the collector apex A". The generated compound motion of the ware W, carried in chuck 150, is a combination of pivoting action about an axis AP (perpendicular to the upper sidewall of the ware W in contact with the collector C), and translation of contact axis AP along the radius of curvature Rt of turret 60, sometimes hereinafter referred to as radial line Rt.

The arc following arrangement is accomplished as follows. Cam 140 is driven synchronously with turret 60 via drive 52 (FIG. 5) and shaft 141 (FIG. 10A) has an outside profile 142 and an inside slotted profile 144. Let the radius of the cam 140 at the position shown in FIG. 9(A) be Ro-x and at FIG. 9(B) be Ro. Similarly, for a symmetrical object, at FIG. 9(C) the radius of cam 140 is Ro-x. Outside cam follower 146 is mounted in a laterally movable yoke or frame 148 in print transfer assembly 58 and follows outside profile 142. Frame 148 is slideably mounted to table 50 by means of slides 149 secured thereto. Chuck 150 is rotatably secured to frame 148 via rotatable bearing 175 and is moved radially therewith along turret radial line Rt by means of the frame mounted cam follower 146. As cam 140 rotates clockwise, (see the progression in FIGS. 9A–9C) the ware is translated along Rt by x units. It should be clear from FIG. 7A that, as the collector C advances its radius RC is colinear with the radius Rt of the turret 60 when the midpoint m of collector C lies along radial line Rt half way through its advance through the printing station D10. Thus, the cam 140 adjusts the position of the print transfer station assembly 58 so that the radial position of the ware W is displaced x units, at the respective leading and trailing edges l and t of collector C, and zero at the midpoint m.

In order to correct for axis rotation, cam follower 152 carried by an arm 154 is operatively coupled to ware carrying chuck 150 via rotatable bearing 175 sleeved in frame supporting yoke 197. The chuck 150 is adapted to be oriented so that the contact axis AP is normal to the ware W at the point of contact with the collector C. It is important to note that the bearing 175 is located in a position vertically beneath contact axis AP, such that, rotation of the ware about AP is the only motion generated due to the rotation of yoke 197 about bearing 175. Thus, the ware W can rotate about its contact axis Ap with collector C as well as translate laterally along the direction of radius Rt. In the position (A) of FIG. 9 arm 154 is B degrees advanced (ie CCW), in FIG. 9 at (B) it is zero (0) degrees advanced or in line with turret radial line Rt and in FIG. 9 (C) it is -B degrees advanced or B degrees retarded (i.e. CW). The combined motion provided by cam 140 maintains the ware ray RW aligned with the collector radius Rc to simulate two surfaces in nonslip-apex-aligned-rolling-motion as described above.

The above system is workable for any ware shape but requires a cam change for each ware profile. Further for some shapes it would not be advisable to extend the principle beyond certain practical limits. For example, reference is directed to FIG. 8B wherein, schematically, there are shown two articles to be decorated. Namely a cup WC and a bowl Wb. The cup is similar to that illustrated in FIG. 8A having a moderately steep side wall angle $\theta c$ and large end diameter DC. Axial length Xc is determined by the former two parameters. Surface wrap angle $\theta c$ is a function of the axial length Xc and diameter Dc. In the case of a cup, the wrap angle is relatively small as shown. A collector CC for the cup can be fabricated to conform to the developed surface Sc of the cup (see also FIG. 8A) and the cup may be oriented as described above to produce apex coincidence with the collector Cc. This is true because the rotational and translational motion required is not severe and does not require reversal of the relative motion of the cup and the turret 60. In the case of a bowl Wb shown in FIG. 8B, the wrap angle $\theta b$ is large and the developed surface Sb is consequently large. However as a practical matter a collector Cb for the bowl could only be practical over some lesser wrap angle, e.g. b'. Thus there is a significant difference in coverage. In the case of the cup all or part of the circumference over the developed surface thereof may be contacted (see cross hatched area) whereas in the case of a bowl the circumferential coverage in one pass would be limited to the modified wrap angle $\theta b'$ over the desired surface (hatched area). Further, while with a cam change it is possible to print a diversity of articles, it may be preferable in certain instances to utilize a simplified embodiment described hereinafter. Before such alternative method is discussed however, an indexing feature of chuck 150 will be described by reference to FIGS. 5, 9, 10A and 10B.

The purpose of the chuck 150 is to receive ware W and secure it at the correct angle for engagement with a collector C. In order to accomplish this, a plurality of indexable paddles 170 are secured to a rotatable block member 172. The latter is rotatably journaled in openings 174 in opposed upstanding support members 173 secured to frame 148. The block 172 carries ware mating chuck plates 176 and depressable spring loaded vacuum pin 178.

In FIGS. 5 and 5B it can be seen that the ware W is indexed onto pad 176 when it is oriented horizontally (Q1 in FIG. 10B). Axial spring 180 secured by flange 179 at distal end of pin 178 is depressed by engagement of the pin 178 with the inside of the ware W as it mates with plate 176. The pin 178 is sleeved through opening 182' in bushing 182 which is coupled to a vacuum line 181 in paddle 170. The pin 178 has a notched or relieved portion 178'. Foot valve 183 is located at a proximate end of said pin 178. As the ware W seats against mating pad 176 pin 178 moves inwardly of bushing 182 opening vacuum line 181 to inside the ware via relieved portion 178' thereby holding the ware firmly into position (see arrows).

Vacuum is maintained in three quadrants Q1–Q3 of the rotation of block 172 and is cut off at Q4 as follows. Sector shaft 185 located concentrically in opening 187 of block 172 carries seal edge 189. Vacuum line 194 has access to a space 191 between sector shaft 185 and the opening 187. The space 191 is normally under vacuum or reduced air pressure and communicates with the interior of the ware W via vacuum line 181 via ports 193. As the ware is loaded at Q1, the pin 179 and spring 180 are depressed opening foot valve 183. The ware W, secured by vacuum, is carried from Q1 to Q2 for decoration by engagement with collector C. Thereafter it is moved to idle position Q3 still under vacuum and thence to Q4 where seal edge 189 blocks port 193 thereby cutting vacuum and releasing the previously depressed spring 180 and pin 178. An air line 195 supplies air to port 193 in the Q4 position to supply air into vacuum line 181 to thereby blow the ware off paddle 170, causing the ware to eject. As the ware moves sufficiently from paddle 176, foot valve 183 closes opening 182' in bushing 182. Vacuum is restored to pin 180 only when the paddle 170 advances from Q4 to Q1 seal edge 189 passing port 193 and foot valve 183 opening by loading new ware. A missed loading will therefore allow maintained vacuum integrity, since foot valve 183 will be maintained closed by spring 180 holding shaft 178 to the left. Sector shaft 185 can be rotated during set up and for timing, but is then locked into a stationary position.

The rotatable block 172 carrying the paddles 170 is driven by a barrel cam actuated drive 186, such as a 8/2 FH 62-120 manufactured by Ferguson Machine Co., through one of two journaled ends 174 of the rotatable block 172 (see FIG. 5). The drive 186 is actuated synchronously with the turret 60 via drive shaft 188 which includes slidable spline coupling 200, a pair of universal joints 201 one each at opposite ends of coupling 200 as shown, and opposed shaft extensions 199 coupled to each universal 201. One shaft extension is coupled to drive 186 via a chain or pulley 205. The opposite shaft extension 199 is secured in bearing 195. Pulley 190 is mounted to free end of shaft extension 199. Another pulley 192 is coaxially driven with a bearing mounted pinion 194 engaging the ring gear 62. The pinion 194 and pulley 192 are appropriately secured by block 196 which is in turn secured to the turret table 50 by frame member 198. Belt 197 couples pulleys 190 and 192.

For ten (10) stations D1–D10 the ratio of the pinion 194 to the ring gear 62 is chosen such that each 1/10 rotation of the turret 60 causes shaft 188 to rotate one turn. Shaft 188 is splined at coupling 200 to move axially as frame 148 moves radially x units as described above. Also universal joints 201 allow the shaft 188 to rotate while the frame is advanced and retarded over the 2B degree swing. As shaft 188 rotates once it actuates drive 186 so that the barrel cam (not shown) therein causes the block 172 and paddles 170 carrying ware W to rotate intermittently 90° or ¼ turn into quadrant Q2 just prior to the time that a collector C enters the print transfer station at D10. Note that the orientation of the paddles 170 at position Q2 is illustrated in FIG. 10B and shows that ware W is aligned with collector C so that contact axis AP, normal to the ware surface, is perpendicular to collector C. As the collector C comes into engagement with the ware W, friction causes the ware W to rotate in nonslipping relation with the collector C. The ware W then is indexed out of quadrant Q2 by a ¼ rotation by block 172 to face downwardly in quadrant Q3 on the inboard side of the print transfer device 58 as shown in FIG. 5. Finally on the next indexing step, the ware W is moved nearly horizontally into the lowermost quadrant 4 for ejection and removal by conveyor means not shown. As explained above, at this portion of the cycle vacuum is cut off by valve action within block 172 thereby releasing the ware W while the spring 180 and positive air pressure from air line 195 urge the ware away from plate 176 and onto the conveyor means (not shown). On the next loading at quadrant Q1, the vacuum is reset.

In another embodiment of the present invention described in the above mentioned patent application Ser. No. 332,726, it is proposed that the cam following print transfer device 58 be held fixed in the position shown in FIG. 9 at (B) with all axes aligned. In order to accomplish this, the collector C would be modified so that its radius of curvature Rc is aligned with and corresponds to that (Rt) of the turret table 60. The ware W would then be oriented by chuck 150 at a fixed position, e.g. aligned with the radius Rt of the turret 60.

Figure 8C:
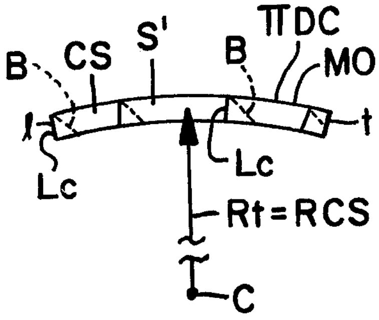
Figure 8B:
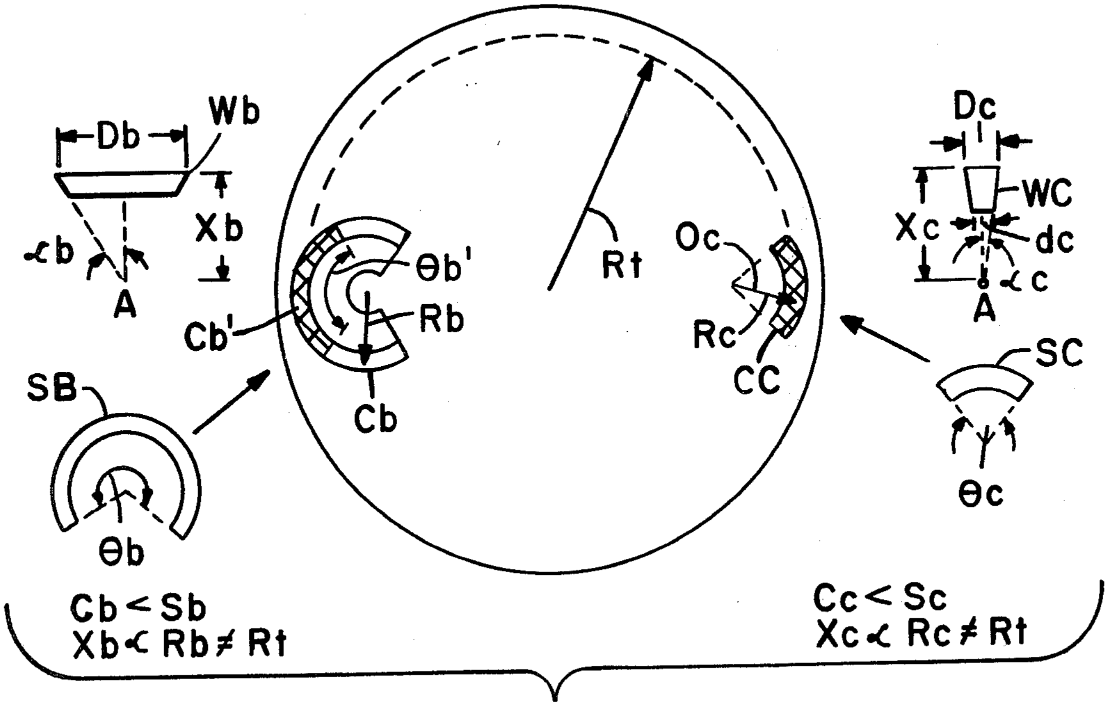

In FIG. 8C, there is shown a reformed collector CS having a modified developed surface S'. The reformed collector CS has a radius of curvature RCS equal to the turret radius Rt and having the same center C. A piece of conical ware or cup WC such as in FIG. 8B has respective large and small end diameters DC and dc. The large diameter defines a circle having a perimeter $\pi$ (DC) and likewise the small diameter dc defines a circle having a circumference $\pi$ (dc). In FIG. 8C it is given that outboard margin MO of modified developed surface S' has an arc length from leading edge l to trailing edge t equal to the large circumference $\pi$ (DC) of cup WC. The inboard margin MO has an arc length which is different i.e. greater than the circumference $\pi$ (dc) of the small end of cup WC. If it is also given that cup WC rolls without slipping, then all points on cup WC move across modified surface S' without slipping. The large end of the cup WC will trace an arc in correspondence with the outboard margin MO of modified surface S'. However, the small end of cup WC will not trace an arc in correspondence with the inboard end MO of surface S' because arc MO longer than the circumference $\pi$ (dc) of the small end of cup WC. If no slipping occurs between cup WC and reformed collector CS, then the collector CS must become progressively distorted. This is symbolized by the progressive angular shift of the dotted line B representing the distortion or buldge across collector CS. Note that as the reformed collector CS moves from right to left bulge B appears to the left. Also line of contact LC remains fixed in alignment with turret center C.

Figure 11:
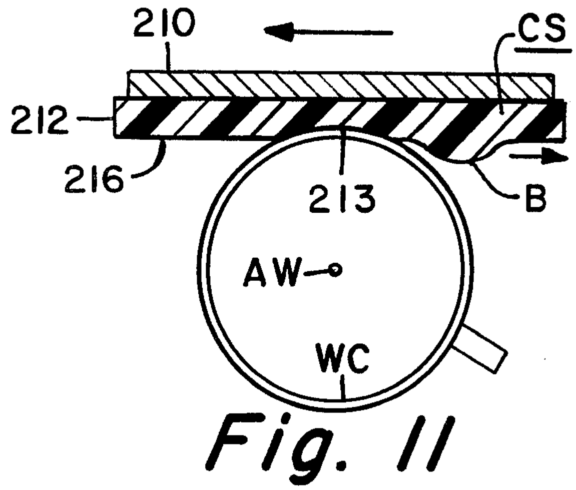
FIG. 11 is a fragmented side section of an alternative embodiment of the print transfer apparatus.

In FIG. 11 the above is best illustrated in side section near the small end of the cup WC. The cup WC has stretched or pushed the collector CS away from itself as a wave or bulge B in the surface of the collector CS.

The reformed collector CS carried by support 210 includes elastomer pad 212 having working surface 216 corresponding to the modified developed surface S'. The cup WC engages collection CS at 213. As the collector CS moves to the left, the small end of the cup WC forces or stretches the elastomer to the right. This occurs because the length of arc traversed by the small end of the cup WC is less than the length of the inboard margin MO of the collector CS. Since the ware does not slip, the elastomer pad 212 gives such that it may be forced out of the path of cup WC forming the bulge B. Forced or stretch printed as hereinbefore described is preferable for large ware such as bowl Wb because it is simpler to provide a modified collector than to attempt a cam change.

The decoration on the underside 216 of the pad 212 is correspondingly distorted or stretched by the forced fitting action. However, for certain types of decorations (e.g. florals) this is immaterial since it is not critical in appearance. On the other hand, in very symmetrical designs with exacting geometric shapes, the distortion caused by this stretch printing effect can be corrected by appropriate modification of the designs installed on the etch cones 72. This might be accomplished by iteration of design manufacture or by some computer assisted graphics technique to compensate therefor.

Other variations are possible and within the scope of printing to any suitable flat surface and the like. For example, in another embodiment of the present invention of FIG. 12 collectors C carried by turret 60 print decoration or decal D to a decal medium 182 supported against collector C by cylindrical backing roll 180. Respective cylindrical unwind and wind rolls 186–188 serve known functions. The backing roll 180, and respective wind and unwind rolls 186 and 188, may be mounted on a common support 184 shown schematically. The common support may be articulated in the circumferential and radial direction of the turret as set forth hereinafter relative to FIGS. 6–10B to compensate for differences between the respective geometries of the decal medium 182, the turret 60 and collector C. Also, if an elastomer surface S is provided on roll 180 forced or stretch printing as set forth in connection with the description of FIG. 11 may be accomplished.

Figure 12:
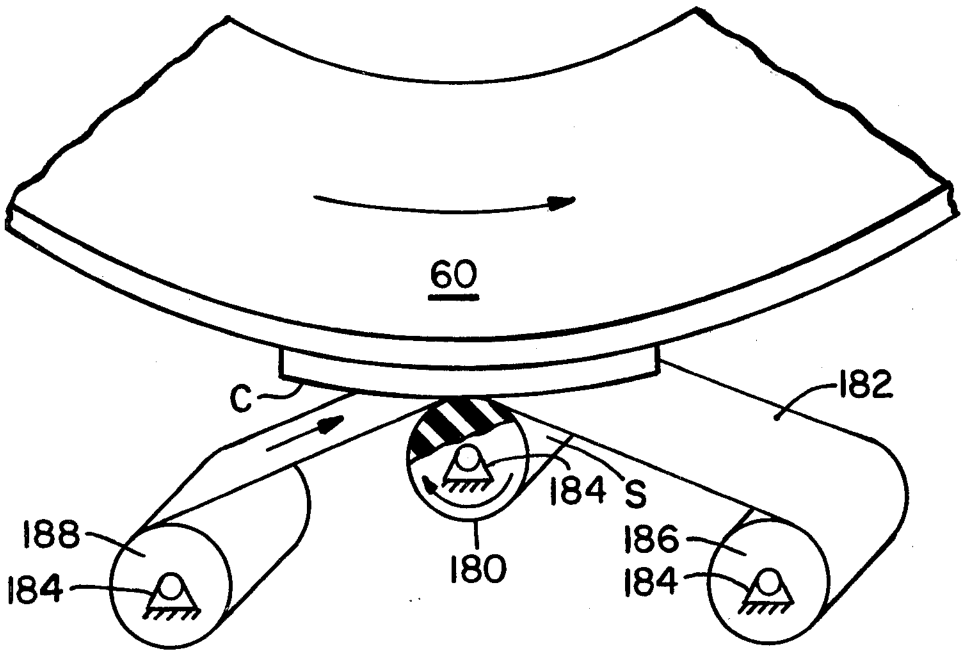

It should be understood that in the above embodiment of FIG. 12, the surface S of backing roll 180 should have a high coefficient of friction for engagement with the medium 182. The surface S may be formed of relatively hard rubber. The backing roll 180 is cross-hatched to show this feature. Alternatively the roll 180 could be metal having a sleeved rubber cover or a suitable adhesive.

In either of the embodiments set forth above, it is important to maintain a nonslip relation between the backing roll 180 and the medium 182 and the collector C so that the medium does not move either radially or circumferentially relative to the backing roll or collector. This assures that the medium acts as a rigid surface fixed instantaneously in respect to the backing roll 180 and the collector C. Thus, distinction of the design D and misregistration thereof is avoided.

While there have been described what are considered to be the preferred embodiments of the present invention it will be obvious to those skilled in the art that various changes and modifications may be made therein without departing from the invention and it is intended in the appended claims to cover all such changes and modifications as fall within the true spirit and scope of the invention.

I claim:

1. A method of transferring a design from a planar design carrying surface to a conic design receiving surface having a central axis and apex therealong, transfer occurring by intimate non-slip rolling contact of the design carrying surface against the design receiving surface, comprising the steps of:

establishing the design in a plane representing a developed surface of the conic design receiving surface, said developed surface having a radius of curvature and a center therefor;

locating the developed surface in the design carrying surface at a radial position about a center of rotation;

rotating the design carrying surface about the center of rotation, the radial position of the design carrying surface being on a radius larger than its radius of curvature;

rotatably supporting the conic design receiving surface about its central axis;

engaging the conic design receiving surface against the design carrying surface;

establishing coincidence bwteeen the center of the developed surface and the apex of the conic design receiving surface;

orienting the conic design receiving surface into intimate rolling contact with the design carrying surface along a line of contact in the plane of the design, whereby the conic design receiving surface rollably engages the design carrying surface to effect the transfer of the design carried thereby on the conic design receiving surface, and including the step of moving the conic design receiving surface relative to the design carrying surface in response to the instantaneous position of the same such that the apex of the conic design receiving surface and the center of the design carrying surface are in coincidence in the line of contact;

maintaining intimate contact along said line of contact in the plane of the design; and maintaining coincidence of the center of the developed surface and the apex of the conic design receiving surface during the step of engaging said surfaces together.

2. A method as set forth in claim 1 wherein the step of orienting the design receiving surface includes translating the design receiving surface relative to the design carrying surface.

3. A method as set forth in claim 1 wherein the step of orienting the design receiving surface includes effecting rotational motion of the design receiving surface about its apex in the plane of the design carrying surface.

4. A method as set forth in claim 3 wherein the step of effecting rotational motion of the design receiving surface includes movably supporting the conic design receiving surface in response to the instantaneous circumferential position of the design carrying surface about the center of rotation for rotating the axis of the conic design receiving surface in accordance with the circumferential position of the design carrying surface.

5. A method as set forth in claim 1 wherein the step or orienting the conic design receiving surface includes indexing the conic design receiving surface into and out of position for contacting the design carrying surface.

6. A method as set forth in claim 5 wherein the step of indexing comprises sequentially positioning the conic design receiving surface into load, print, idle, and eject positions relative to said design carrying surface, and holding the conic design receiving surface from the load through eject positions.

7. A method as set forth in claim 1 wherein the step of engaging the conic design receiving surface with the design carrying surface includes camming a profile related to at least one of circumferential and axial geometry of the design receiving surface for effecting at least one of respective translational and rotational motion thereof relative to the design carrying surface about its center or rotation.

8. A method as set forth in claim 7 wherein the step of engaging includes the steps of moving the design receiving surface in respective axial and circumferential directions relative to the design carrying surface as it moves about its center of rotation.

9. A method of transferring a design from a design carrying surface to a conic design receiving surface having a central axis and apex therealong, the transfer occuring by intimate non-slip rolling contact of the design carrying surface against the conic design receiving surface comprising the steps of:

establishing the design in a plane representing a developed surface of the conic design receiving surface, the said developed surface having a radius of curvature and a center therefor;

locating the developed surface at a radial position about a center of rotation;

rotating the design carrying surface about the center of rotation, the radial position of the design carrying surface being on a radius larger than its radius curvature;

rotatably supporting conic design receiving surface about its central axis;

engaging the conic design receiving surface against the design carrying surface;

orienting the conic design receiving surface into intimate rolling contact with the design carrying surface along a line of contact, whereby the conic design receiving surface rollably engages a design carrying surface to effect transfer of the design carried thereby onto the conic design receiving surface, and including a step of forcing the conic design receiving surface and the design carrying surface together in a fixed relation as the design carrying surface is carried about its center of rotation, such that, the design carrying surface is deformed; and maintaining intimate contact along said line of contact as the conic design receiving surface rolls against the design carrying surface.

10. A method as set forth in claim 9 wherein the step of forcing the design receiving surface and design carrying surface together includes the step of deforming the design carrying surface as the same is carried about its center of rotation into engagement with the design receiving surface.

11. A method as set forth in claim 10 including the step of graphically distorting the design carried by the design carrying surface by an amount relatively equivalent to the deformation occasioned by the forcing engagement of the design carrying surface and the design receiving surface such that the design thereby becomes graphically corrected relative to the design receiving surface.

* * * * *